US011378923B2

(12) United States Patent
Yamine et al.

(10) Patent No.: US 11,378,923 B2
(45) Date of Patent: Jul. 5, 2022

(54) METHODS OF MATRIX ASSISTED INTELLIGENT RECYCLING CHUTE SELECTOR DEVICES

(71) Applicants: Elias Yamine, Tulsa, OK (US); Alexander Yamine, Tulsa, OK (US)

(72) Inventors: Elias Yamine, Tulsa, OK (US); Alexander Yamine, Tulsa, OK (US)

(*) Notice: Subject to any disclaimer, the term of this patent is extended or adjusted under 35 U.S.C. 154(b) by 108 days.

(21) Appl. No.: 16/258,129

(22) Filed: Jan. 25, 2019

(65) Prior Publication Data

US 2019/0243316 A1 Aug. 8, 2019

Related U.S. Application Data

(60) Provisional application No. 62/626,901, filed on Feb. 6, 2018.

(51) Int. Cl.
*G05B 13/02* (2006.01)
*H04L 67/125* (2022.01)
*G05B 19/042* (2006.01)
*G05B 19/05* (2006.01)

(52) U.S. Cl.
CPC ......... *G05B 13/027* (2013.01); *G05B 19/042* (2013.01); *H04L 67/125* (2013.01); *G05B 19/05* (2013.01)

(58) Field of Classification Search
None
See application file for complete search history.

(56) References Cited

U.S. PATENT DOCUMENTS

| 5,390,863 | A | * | 2/1995 | Tondo | B65F 1/0093 |
| | | | | | 241/100 |
| 7,422,144 | B1 | * | 9/2008 | Importico | B65F 1/0093 |
| | | | | | 193/31 R |
| 2011/0046775 | A1 | * | 2/2011 | Bailey | B07C 3/02 |
| | | | | | 700/224 |
| 2014/0201126 | A1 | * | 7/2014 | Zadeh | A61B 5/165 |
| | | | | | 706/52 |
| 2018/0042582 | A1 | * | 2/2018 | Pringle | A61B 17/320068 |

* cited by examiner

*Primary Examiner* — Mohammad Ali
*Assistant Examiner* — Saad M Kabir
(74) *Attorney, Agent, or Firm* — Sughrue Mion, PLLC

(57) ABSTRACT

This description relates to garbage chutes and more particularly to recycling of waste management utilizing intelligent software and computer hardware along with mechanical hardware to implement protocols to properly separate recycled waste into corresponding waste receptacles. Each deposit is logged into a database where software management of analytics aids in the proper management of disposal of waste and timing of separation of recyclable goods creating a more efficient recycling management system.

33 Claims, 9 Drawing Sheets

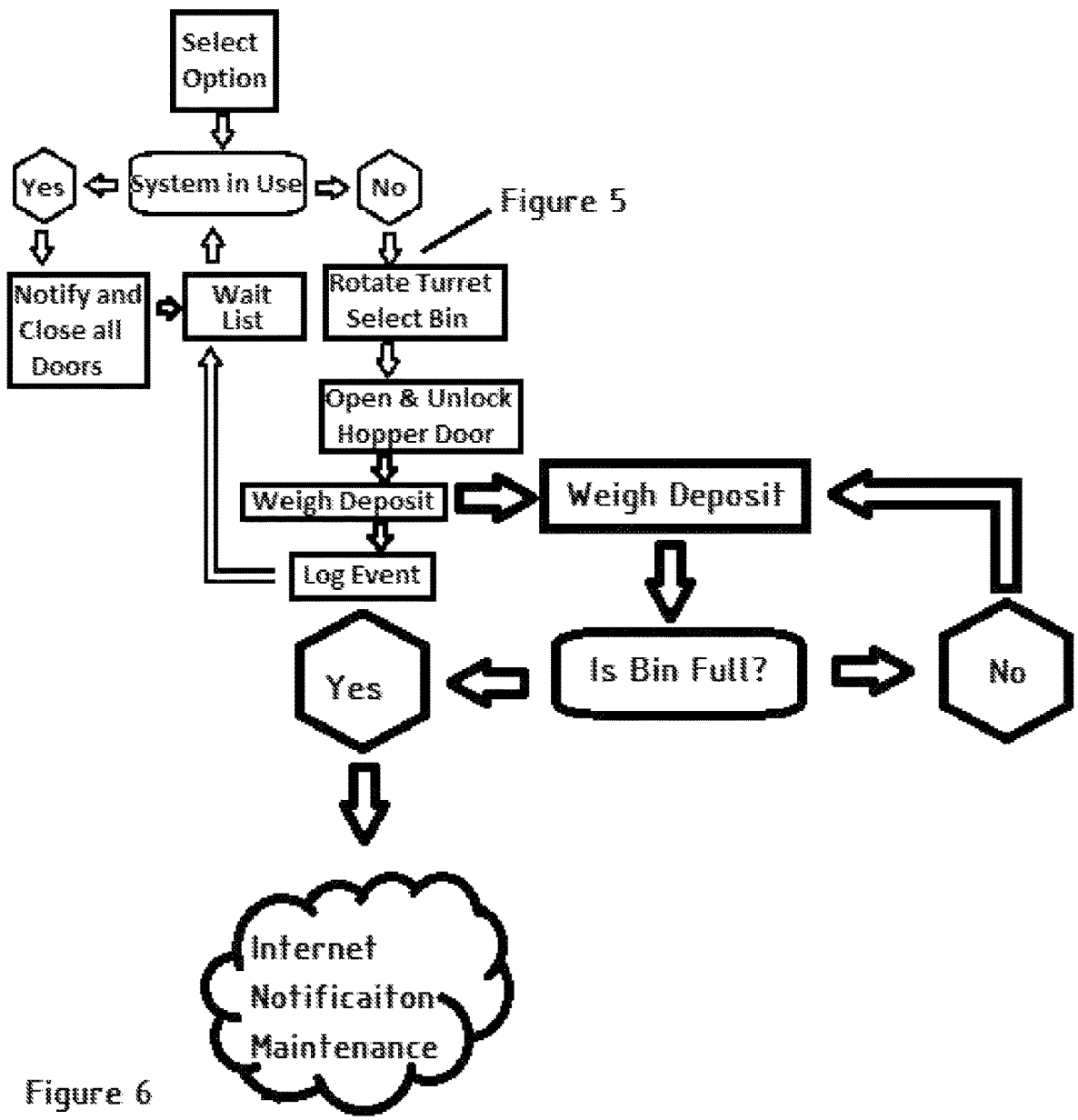

METHODS OF MATRIX ASSISTED INTELLIGENT RECYCLING CHUTE SELECTOR DEVICES

BACKGROUND OF THE INVENTION

Recycling is the process of collecting and processing wasted materials that would otherwise be thrown away as trash and turning them into new products. Recycling benefits communities and the environment. After collection, recyclables are sent to a recovery facility to be sorted, cleaned and processed into materials that can be used in manufacturing. Recyclables are bought and sold just like raw materials would be, and prices go up and down depending on supply and demand. Recycled materials are also used in new ways such as recovered glass in asphalt to pave roads or recovered plastic in carpeting and park benches.

Garbage chutes are the best way to consolidate trash from building tenants which allow said tenants to place their garbage or trash into a central location usually in the basement of said building for easier pick-up. The access to a trash chute means that the persons working or living in a building are not required to move garbage from their living or operating quarters to an outside dumpster. In the early seventies, buildings in New York City replaced garbage incinerators with trash chutes and compactors because there was an air-quality concern. This cut down on pollution.

There are rooms on every floor that give building residents access to the chute so they can throw their garbage away without having to go down to the basement where garbage is collected. The garbage or refuge piles up at the base of the chute, where a device eventually crushes it into smaller blocks of trash. The blocks of trash are then removed and taken to a garbage dump, but things ooze and build up—which is where serious problems arise.

Recycling is important because waste has a large negative impact on the environment. There are harmful chemicals and even greenhouse gasses that are released from refuge that is piled up in landfill sites. It has been proven that recycling helps reduce the pollution caused by waste. Recycling reduces the need for raw materials so that the rainforests can be preserved and prevents plastic and other harmful man-made containers to build up in our oceans and waterways. It will become apparent in this application that sufficient description has been given and other modifications could be made without departing from the scope or spirit of the art.

SUMMARY OF THE INVENTION

The design for Methods of Matrix Assisted Intelligent Recycling Chute Selector Devices is comprised of 16 components, namely a means for wireless controlling recycle system entry door when said system is currently in use on other floors, a means for wired PLC (Programmed Logic Control and Power Line Carrier Reference carry dual meaning) controlled recycle system entry door when said system is currently in use on other floors, a means to notify all floors said system is currently in use, a means to allow access to disposal chute on active floor, a means to wirelessly identify proper selection of recyclable material to wirelessly control turret at base of disposal chute, a means to rotate chute turret via wireless or data over single wire PLC commands, a means to identify waste material matches proper selection of recyclable material, a means to weigh deposited waste in selected recycle bins, a means to log deposit information such as recycled material selection, weight, time, date and active door ID, a means to identify when a recycle bin is full, a means to notify proper personnel when said recycle bin is full, a means of remote access to recycle system to monitor usage analytics, recycle statistics and weight of recycle bins, a means to augment intelligent actions to correlate proper functionality of said intelligent waste recycling system, a method to utilize a compactor which compacts waste materials into smaller components to manage waste disposal area, a means to utilize linear actuators which activate ledges in hopper doors to manage time of deposited materials entering said chute, a means to maintain and clean said chute utilizing sprinklers and weighted brushes and a means to provide safety measures during fire and emergencies.

METHODS OF PREFERRED EMBODIMENTS

A means for wireless controlling recycle system entry doors when said system is currently in use on other floors is comprised of a central monitoring server which monitors system status of each Node on every floor. The said central monitoring system can be a matrix controlled device such as a PC with proper software to control the flow of information between said Nodes. Each node is a touch screen tablet with sufficient software and serial communication interface such as wireless technology used for exchanging data between fixed and mobile devices over short distance using UHF radio waves to control local devices such as relays to control door locks.

The means further comprises of a logical system which discerns conditions of the current operation of the intelligent recycling system using Python code below to show how such buttons can prevent a secondary selection while system is in use:

```
import tkinter as tk
import tkinter.font
#from gpiozero import LED, Button
from RPI.GPIO as GPIO
from signal import pause
from time import sleep
# import serial here
win=tk.Tk( )
win.title("ARBOR 4.0")
myFont=tkinter.font.Font(family = 'Helvectica', size = 24, weight = "bold")
Set up Pins according to selection
# however if serial connection can be made through ttyAMO or ttyUSB omit the pin selection and use serial events
# then set up serial here
led1 = LED(20)
led2 = LED(21)
#led4 = LED(16)
#button = Button(2)
```

```
GPIO.setmode(GPIO.BCM)
GPIO.setup(20, GPIO.OUT)
GPIO.setup(21, GPIO.OUT)
# limButton is the GUI which tells the person another floor is busy
def limButton( ):
    while True:
        if button.is_pressed:
            limButton["text"]="System In Use"
            break
        else:
            limButton["text"]="Door Available"
            plasticButton["text"]= "Plastic"
            glassButton["text"] ="Glass/Metal"
            paperButton["text"]="Paper"
            refugeButton["text"]="Refuge"
                #everything is done so return buttons back to original state for next user
            break
    # the nested "if" statements below ensure that no other button selection can be chosen
    # if another button is in action
def selectOption1( ):
    if led1.is_lit:
        led1.off( )
        paperButton["text"]="Paper"
    else:
        if plasticButton["text"] != "Please Wait!":
            if glassButton["text"] != "Please Wait!":
                if refugeButton["text"] != "Please Wait!":
                    if limButton["text"] != "System In Use":
                        led1.on( )
                        sleep(0.5)
                        led1.off( )
                        paperButton["text"]= "Please Wait!"
def selectOption2( ):
    if led2.is_lit:
        led2.off( )
        plasticButton["text"]="Plastic"
    else:
        if paperButton["text"] != "Please Wait!": #condition 1 met
            if glassButton["text"] != "Please Wait!": #condition 2 met
                if refugeButton["text"] != "Please Wait!": #condition 3 met
                    if limButton["text"] != "System In Use": #condition 4 met
                        led2.on( ) #if all above are met.. then toggle signal
                        sleep(0.5)
                        led2.off( )
                        plasticButton["text"]= "Please Wait!"
def selectOption3( ):
    if led2.is_lit:
        led2.off( )
        glassButton["text"]="Glass or Metal"
    else:
        if paperButton["text"] != "Please Wait!":
            if plasticButton["text"] != "Please Wait!":
                if refugeButton["text"] != "Please Wait!":
                    if limButton["text"] != "System In Use":
                        led2.on( )
                        sleep(0.5)
                        led2.off( )
                        glassButton["text"]= "Please Wait!"
def selectOption4( ):
    if led4.is_lit:
        led4.off( )
        refugeButton["text"]="Refuge"
    else:
        if paperButton["text"] != "Please Wait!": #condition 1 must be met
            if glassButton["text"] != "Please Wait!": #condition2 must be met
                if plasticButton["text"] != "Please Wait!": #condition 3 must be met
                    if limButton["text"] != "System In Use": #finally condition 4 met
                        led4.on( )
                        sleep(0.5)
                        led4.off( ) #toggle relay to send signal of selection
                        refugeButton["text"]= "Please Wait!"
    # close the program. This button will be removed when in production
def exitProgram( ):
    win.quit( )
    win.destroy( )
```

```
    #pack the GUI with buttons and call the functions
    limButton=tk.Button(win, text='Door Available', font=myFont, bg='blue', height=2,
width=32)
    limButton.grid(row=0, sticky=tk.NSEW)
    paperButton=tk.Button(win, text='Paper', font=myFont, command=selectOption1,
bg='blue', height=2, width=38)
    paperButton.grid(row=1, sticky=tk.NSEW)
    plasticButton=tk.Button(win, text='Plastic', font=myFont, command=selectOption2,
bg='blue', height=2, width=38)
    plasticButton.grid(row=2, sticky=tk.NSEW)
    glassButton=tk.Button(win, text='Glass or Metal', font=myFont,
command=selectOption3, bg='blue', height=2, width=38)
    glassButton.grid(row=3, sticky=tk.NSEW)
    refugeButton=tk.Button(win, text='Refuge', font=myFont, command=selectOption4,
bg='blue', height=2, width=38)
    refugeButton.grid(row=4, sticky=tk.NSEW)
    exitButton=tk.Button(win, text='Exit', font=myFont, command=exitProgram,
bg='red', height=1, width=6)
    exitButton.grid(row=5, sticky=tk.E)
    tk.mainloop( )
```

Where each of the nested "if" statements must be met before the system allows another user to activate their selection. Each floor will be notified of the system's usage and if the system is available, the buttons will all be available and "System Available" will be in the upper button on the user interface.

A means for wired PLC controlled recycling system entry doors when said system is currently in use on other floors is further comprised of a Data Over Wire (DOW) protocol whereby said data is sent through a power line carrier packet protocol to communicate between nodes on each floor whereby a single wire carries digital information between nodes to provide actions and functions pertaining to the proper operation of said Methods of Matrix Assisted Intelligent Recycling Chute Selector Devices. Power line carrier protocols include BQPSK, PSK, Frequency hopping using Datagram sensing multiple access and ADHoc Protocols along with Zero Crossing X-10, extended X-10 and Electronettics, where data signals are generated in a carrier frequency and transmitted over a single wire to a remote destination via balun coil where data transfers from a carrier wave over inductive signal to a remote receiver, demodulated and interpreted and not limited to ASCII, ANSI or other data protocols to communicate between nodes.

The PC currently being proposed for use is a Windows OS with wireless WiFi interface to an internal and external network to allow remote access to said central monitoring system from the Internet or other wireless networks such as a remote cellular device or small package Raspberry Pi touch screen interfaces. Each of the touch screen interfaces control local access and remote turret functionality via aforementioned wired and wireless protocols. The PC containing sufficient application software and firmware serial interface to control external functions and actions of the entire Methods of Matrix Assisted Intelligent Recycling Chute Selector Devices system. This PC interface includes but is not limited to local and remote log in for user interoperate ability, Chute fan for ventilation evacuation, sprinkler valve for cleaning the system, floor node control of door and user information as well as future upgrades, turret operation and diagnostics as well as full system diagnostics for proper functionality. Said PC further contains a Natural Event Processor (NEP) whereby said NEP collects analytics for adaptation, monitoring and notification of proper operation. Said NEP is constrained to probability Boolean and variable event interpretation of sensors used to determine proper functionality whereby said Boolean events data is collected, compared to known factors and derived probability outcomes which improve system operations. This is done by 6 Classes of functionality (Intelligence Class or main logic interpreter, Bank Class or temporary data holding class to determine where information is to be stored or used for future reference, Blueprint Class where information is formatted for storage and retrieval, Comparator Class where probability Boolean data or collected information is stored for input data comparison, Policy Class where data is constrained to a policy to determine proper out and Engine Class where all data input and output is rerouted to the proper destination class) to generate a proper data format, here a serial sensor monitor converts environmental data from the Methods of Matrix Assisted Intelligent Recycling Chute Selector Devices and utilizes a Bayesian Network Protocol for adaptive alteration of viewable information, notification of event not limited to full bins (Recyclable Material in bins reaches maximum capacity) and selection identification to generate probability predictions of bin capacity prior to full status. The PC Data Intelligence Protocols will also generate Visual Graphical User Interfaces or GUIs to assist in visual representation of materials being recycled.

This said bin status data collection generates a predictable model whereby over time information is collected, saved and NEP determination of event of full bin is predicted by prior collected data determining the probability of a full bin time status for notification and analytical purposes. Further analytical data may derive collection weight of each of the recyclable classes such as Glass, Plastic, Metal and Paper as well as waste byproducts such as unusable refuge and or Organic Waste.

A means to notify all floors said system is currently in use is a wireless or single wired signal which is sent from the central monitoring intelligent server. When a selection is made on an active floor, the said central monitoring server logs the event and checks usage status on other floors prior to allowing access to the chute on the requesting floor. If the system is not in use, it sends a command to each floor in a Binary signal. An example of said Binary signal command is as follows:

A 10 floor unit would have 10 binary positions. If system is not in use, all floor doors will remain locked at all times. When an active floor for example floor 5 makes a request to the central monitoring server, a binary signal is sent out where "0" (Zero) represents "Locked Status" and a "1" (One) represents an "Unlocked Status". Binary signal is as follows. 0000100000 where each Node knows to remain locked as long as there is a "1" in the binary argument.

If Binary contains "1"
 Then Relay condition locked
If Binary are all "0"
 Then Relay condition may unlock if no other request has been made prior.

This Binary system allows each Node to know the lock/unlock condition and logging of said Node condition by the central monitoring system will maintain proper functionality of said door usage.

It may be known to those skilled in the art of utilizing other mechanisms to determine usage status on each node such as HEX, ASCII or ANSI protocol interpretation and can be easily implemented for nodal usage identification however it is understood other functionalities may also be necessary and it is the determination of the binary system which simplifies the data packet and said other applications can achieve the same result as not to infringe on the scope or spirit of the proposed nodal control system.

A means to allow access to disposal chute on active floor is comprised of an electromagnetic lock which is controlled by a serial interface where said serial signal is wirelessly or single wired, sent from a Touch Screen Node to a receiving controller which identifies the serial command to either lock or unlock (energize or de-energize) said magnetic controller. The said door is connected to the chute on every floor and when an active event is initialized, the central monitoring server system looks to see if the system is currently in use. If it is not, the system sends a "Ready" signal to the active Node allowing it access to the system. The door controller receives an "Unlock" command and the Node User Interface (UI) initiate the active event with instructions to the person/s initializing the waste deposit. If the system is currently in use, the central monitoring system places the active user in a wait list which hierarchically places each active user in sequential order until such time the said waste management system is no longer active and in use by other person/s.

If said door has a volume linear actuator controlled area, other said first users may have access to other said doors on other floors simultaneously as mentions further down in the means of linear actuated doors. Said door control system allows first users to have a first come first serve order to make a more efficient use of high volume usage times thereby preventing longer wait times when system is in said high volume use.

The Floor Node Controller currently being proposed is a Touch Screen Tablet using Android OS or Linux based Raspian on Raspberry Pi Touch Screen interface equipped with wireless technology used for exchanging data between fixed and mobile devices over short distances using UHF radio waves for serial and web based serial controller access to external hardware devices for control access and operations of said devices. These devices include Chute door access controllers, Material identification electronics such as sonic transducers, particle TMDI (Thermal Mass Density Identification) or Maldi Scan hardware to determine sufficient information pertaining to the discarded materials being recycled. For instance said discarded material may be identified by the discarder as metal and sufficient sensors located in the door identify the discarded waste as "glass" due to electronic sensors determining the confidence score of returned information matching that of Glass and not Metal. This determination can prompt the said user to make a second selection prior to allowing the discarded materials from entering the Chute.

A means to wirelessly identify proper selection of recyclable material to wirelessly control turret at base of disposal chute is comprised of a central monitoring server with wireless WiFi and/or Wireless Serial communication or data over single wire protocols such as RS232 and RS485 which send signals from each Node to the Central Monitoring Intelligence Server that identifies each person/s selection for recyclable material. Once a selection is made, the central monitoring server software sends a wireless or data over single wire signal to the stepper motor controller which rotates the turret of the "Sorter" (Sorter and Diverter are identified as one and the same meaning herein) whereby said "sorter" may be a "Bi-Sorter (2), Tri-Sorter(3) Quad-Sorter (4) up to but not limited to an Oct-Sorter (8) to the proper position according to each person/s selection at each Node. The Recycle Bins are placed in a 360 degree rotation respective 180 degree apart (Bi sorter), 120 degrees (Tri-Sorter), 90 degrees apart (Quad-Sorter) or 45 degrees (Oct-Sorter) whereby said turret rotates to the selected bin prior to the central monitoring server sending an "Unlock" to the active Node requesting to discard materials.

A person/s making selection on a touch screen with virtual buttons will correspond to proper identification of recyclable goods and waste materials which is relayed to the central monitoring server for logging and logic processing. However in this proposal we propose a RFID "Radio Frequency Identification Tag" which is placed on the deposited bag which identifies which person/s deposited recyclable waste so as to identify a match of selection, time, date and weight of said recyclable deposit. Further options of "Metal Detection" as well as the use of Sonic Ultrasound Refraction, aforementioned TMDI and Maldi Scan can be utilized to correspond to person/s selection with matching waste material sensor information.

A means to rotate chute turret via wireless commands is comprised of a wireless or data over single wired communication protocol controlled by a central monitoring server which receives Nodal information and relays results to Natural Event Processor using "Probability Boolean" algorithms for decision making. Once the decision has been made to rotate said turret, the said central monitoring server utilizes various serial and WiFi protocols to communicate wirelessly to a receiver controller which sends signals to the stepper motor control system. In this proposal we are utilizing RS232 protocol. Arguments as follows:

```
#include <Stepper.h>
int forward = 2;
int reverse = 3;
Stepper motor(200, 10,11,12,13);      // Set up Variables and declarations
void setup( ) {                        // set receiver up for 9600 baud
pinMode(forward,INPUT);
pinMode(reverse,INPUT);
Serial.begin(9600);
}
void loop( ) {                         // Wait for input commands
int Speed = analogRead(A0);
int RPM = map(Speed, 0, 1023, 0, 100);
int f = digitalRead(forward);          // Move Motor Forward
int r = digitalRead(reverse);          // Move Motor Reverse
if(f == 1 && r == 0 && RPM > 1){       // set Increment speed
motor.step(1);
motor.setSpeed(RPM);
delay(.01);
}
```

```
if(r == 1 && f== 0 && RPM > 1){
motor.step(-1);
motor.setSpeed(RPM);
delay(0.01);
}
delay(5);
Serial.println(RPM);   // send Serial information back to Control Server
}
```

Example of communication protocol shows how Serial communication commands sent from the Central (Print) to stepper motor controller (Read) determines movement positions of said stepper motor. Integers for Plastic, Glass, Metal and Rubbish can be set up where Plastic=Position "0", Glass=Position "90", Metal=Position "180" and Rubbish=Position "270" where a 32 bit processor would divide position 360 by 1024 increments or 2.84=1 degree axis movement. Therefore 90 degree position would equal 256, 180=512 respectively.

A means to identify waste material matches proper selection of recyclable material is comprised of an a RFID "Radio Frequency Identification Tag" which is placed on the deposited bag which identifies which person/s deposited recyclable waste so as to identify a match of selection, time, date and weight of said recyclable deposit. Further options of "Metal Detection" as well as the use of Sonic Ultrasound Refraction, TMDI and Maldi Scan can be utilized to correspond to person/s selection with matching waste material sensor information.

An ultrasonic transducer sends a primary signal in the direction of the material being discarded whereby said signal echoes off said material and returns a signal which can be compared to stored information deviated over time. Said return signal corresponds to discarded material density to properly identify material population within the confines of the container of material being discarded.

A Laser Carrier frequency sends a primary signal in the direction of the material being discarded whereby said signal refracts off said material and returns a signal which can be compared to stored information deviated over time. Said return signal corresponds to discarded material density, temperature and mass to properly identify material population within the confines of the container of material being discarded.

A Particle Carrier Wave sends a primary signal in the direction of the material being discarded whereby said signal absorbs part of the particle density of the said material and records a signal in a receiver which can be compared to stored information deviated over time. Said return signal corresponds to discarded material density, temperature and mass to properly identify material population within the confines of the container of material being discarded.

A means to weigh deposited waste in selected recycle bins is comprised of a load cell which is connected to an amplifier. In this application we propose the use of the HX 711 load cell amplifier connected to a MCU "Microcontroller Unit". Arguments identify two processes for calibration and runtime functionality with code as follows:
Code:

```
#include "HX711.h"
#define DOUT 3
#define CLK 2
HX711 scale(DOUT, CLK);
float calibration_factor = -7050; //-7050 worked for my 440lb / 200kg max scale setup
void setup( ) {
    Serial.begin(9600);
    Serial.println("HX711 calibration sketch");
    Serial.println("Remove all weight from scale");
    Serial.println("After readings begin, place known weight on scale");
    Serial.println("Press + or a to increase calibration factor");
    Serial.println("Press - or z to decrease calibration factor");
    scale.set_scale( );
    scale.tare( ); //Reset the scale to 0
    long zero_factor = scale.read_average( ); //Get a baseline reading
    Serial.print("Zero factor: "); //This can be used to remove the need to tare the scale. Useful in permanent scale projects.
    Serial.println(zero_factor);
}
void loop( ) {
    scale.set_scale(calibration_factor); //Adjust to this calibration factor
    Serial.print("Reading: ");
    Serial.print(scale.get_units( ), 1);
    Serial.print(" lbs"); //Change this to kg and re-adjust the calibration factor if you follow SI units like a sane person
    Serial.print(" calibration_factor: ");
    Serial.print(calibration_factor);
    Serial.println( );
    if(Serial.available( ))
    {
        char temp = Serial.read( );
        if(temp == '+' || temp == 'a')
            calibration_factor += 10;
        else if(temp == '-' || temp == 'z')
            calibration factor -= 10;
    }
}
Calibration Complete, Now read weight:
Code:
#include "HX711.h"
#define calibration_factor -7050.0 //This value is obtained using the HX711_Calibration
#define DOUT 3
#define CLK 2
HX711 scale(DOUT, CLK);
void setup( ) {
    Serial.begin(9600);
    Serial.println("HX711 scale demo");
    scale.set_scale(calibration_factor); //This value is obtained by using the HX711_Calibration
    scale.tare( ); //Assuming there is no weight on the scale at start up, reset the scale to 0
    Serial.println("Readings:");
}
void loop( ) {
    Serial.print("Reading: ");
    Serial.print(scale.get_units( ), 1); //scale.get_units( ) returns a float
    Serial.print(" lbs"); //You can change this to kg but you'll need to refactor the calibration_factor
    Serial.println( );
}
```

The HX711 converts a Piezoelectric signal from a load cell from an analog to digital which is converted to an integer. This said integer is recorded and transmitted to a central processing computer where information is logged and utilized for future predictable modeling of SMA (Similarity Mapping Algorithms) to determine when a bin will be full prior to being in the filled state. As information is collected, the data forms a linear probability of usage information which can be utilized to determine usage over time. This said usage is said to be "Predictable" and this predictable model can be utilized for notification of proper authority or personnel to empty waste materials so as to prevent waste materials from overflowing onto the floor outside said recyclable bins.

A means to log deposit information such as recycled material selection, weight, time, date and active Door ID is comprised of a database which stores information it tables and cells regarding Date and Time stamp of events, Active Door Station ID and Weight. This information is for use with analytics which shows how much of each recyclable material is commonly discarded. A log file hardware interface firmware would look like this:

```
#include <SPI.h>
#include <SD.h>
const int chipID = 4;
void setup( ) {
    // Open serial communications and wait for the serial port to open:
    Serial.begin(9600);
    while (!Serial) {
        ; // Now wait for serial port to connect.
    }
    Serial.print("Initializing SD card...");
    // Check to see if the SD card is present and if it can be initialized:
    if (!SD.begin(chipID)) {
        Serial.println("Card failed, Is not present, Or cannot be Initialized");
        // The logger can't do it so stop the program:
        while (1);
    }
// Card initialized so you can log data now
    Serial.println("card initialized.");
}
void loop( ) {
    //Now make a string for assembling the data to write to the log:
    String DatString = "";
    // read the sensors and append to the string:
    for (int analogPin = 0; analogPin < 3; analogPin++) {
        int sensor = analogRead(analogPin);
        DatString += String(sensor);
        if (analogPin < 2) {
            DatString += "";
        }
    }
    // Open the file. Only one file can be open at a time,
    // You have to close one file before opening another.
    File DatFile = SD.open("datalog.txt", FILE_WRITE);
    // If the file is available, write to it:
    if (DatFile) {
        DatFile.println(DatString);
        DatFile.close( );
        // print to the serial port too:
        Serial.println(DatString);
    }
    // if the file isn't open, pop up an error:
    else {
        Serial.println("error opening datalog.txt");
    }
}
#End Program.
```

The logged information is stored on a SD card and can be backed up to the cloud via the central server. The "Println" in the code writes to the Serial port which is received by the central server and stored in code. A simple serial reception code on the central server would look like this:

```
if (tBoxDataIn.Text.Contains("Floor"))
    {
        tBoxDataIn.Text = "";
        char[ ] flr = new char[ ] { 'F', 'l', 'o', 'o', 'r', ' ', '=', ' '
};
        textBox4.Text = dataIN;
        textBox4.Text.TrimStart(flr);
        string text = textBox4.Text;
        text = text.TrimStart(flr);
        textBox4.Text = (text);
        tBoxDataIn.Text = "";
    }
```

Where said.Text tBoxDataIn is an input which tells the data where to go in the log file. Once the incoming data is identified as a specific reference such as Floor, Material, Weight ect, said data is constrained to the identified genre and now placed in a flat file, database or Dat file for future analytics. This code to write to said flat file for storage and retrieval would look like this:

```
if (tBoxDataIn.Text.Contains("Log File"))
    {
        textBox1.Text = (getlastid("C:/Recycle/Recycle.txt") + 1).ToString(
);
                StreamWriter sw = new
                StreamWriter("C:/Recycle/Recycle.txt",
true);
                sw.WriteLine("<ID> " + textBox1.Text + " <ID>");
                sw.WriteLine("<Date>" + " " + textBox2.Text);
                sw.WriteLine("<Selection>" + " " + textBox3.Text);
                sw.WriteLine("<Floor#>" + " " + textBox4.Text);
                sw.WriteLine("<Weight>" + " " + textBox5.Text);
                sw.WriteLine("<User>" + " " + tbUser.Text);
                sw.WriteLine("<Building>" + " " + tbBuilding.Text);
                sw.WriteLine("");
                textBox3.Text = "";
                textBox4.Text = "";
                textBox5S.Text = "";
                tbUser.Text = "";
                sw.Close( );
                lblLogFile.Text = "Log File Recorded!";
    }
```

Each of the incoming bytes of information are properly identified and placed in a proper textbox field corresponding to the input reference. Once the information event is fulfilled, the log file is recorded automatically with a final code:

```
{
    StreamReader sr = new StreamReader("C:/Recycle/Recycle.txt");
    richTextBox1.Text = sr.ReadToEnd( );
    sr.Close( );
}
```

Where the StreamReader (sr) writes to the file located in the "C:\Recycle\Recycle.txt" file. In this particular file each entry is identified through an event ID which identifies each event individually for future reference and are delimited by "<and>" brackets with proper identity tags used in XML class services. This allows said stored information to be placed in the file and delimited for Database, DAT or other storage and retrieval services. In this particular application said data is used for analytics using the NEP processing software which guides predictability modeling of stored information.

A means to identify when a recycle bin is full is comprised of a plurality of methods. First method of choice is utilizing a weight scale which weighs the trash bin's capacity in Kilograms. This information is relayed to a central monitoring server which is stored in a database where said stored information is compared to newly recorded data to pattern match how full a particular given bin is at the moment of each use. A Boolean based engine can be set up to store memories of gathered information which utilizing Bayesian Neural Network protocols, gives the Boolean engine the capability to compare each use of information to newer information giving constant change to the updates. When a pattern match to a full weight is accomplished during an event of usage, the system compares the kilogram capacity to stored comparisons and notifications are sent out to maintenance to let them know the bins are ready to be emptied.

A means to identify when a recycle bin is full is further comprised of sonic transducer distance sensing which identifies where the distance of recyclable material is in reference to the capacity of said recyclable bin. In this application we utilize a HC-SR04 Ultrasonic Module which has 4 pins, Ground, VCC, Trig and Echo. The Ground and the VCC pins of the module are connected to the Ground and the 5 volts pins to a MCU respectively and the trig and echo pins to any Digital I/O pin on said MCU. In order to generate an ultrasound signal, we set the Trig on a High State for 10 µs. That will send out an 8 cycle sonic burst which will travel at the speed sound and it will be received in the Echo pin after colliding with the surface known as the "Work Function". The Echo pin will output the time in microseconds the sound wave traveled. An example of this would be if the object is 10 cm away from the sensor, and the speed of the sound is 340 m/s or 0.034 cm/µs the sound wave will need to travel about 294 u seconds. But what you will get from the Echo pin will be double that number because the sound wave needs to travel forward and bounce backward. So in order to get the distance in cm we need to multiply the received travel time value from the echo pin by 0.034 and divide it by 2. The code for the Transducer Distance Sensor (HC-SR04) would look like this:

```
const int trigPin = 4;
const int echoPin = 5;
// defines variables
long duration;
int distance;
void setup( ) {
pinMode(trigPin, OUTPUT); // Sets the trigPin on MCU as an Output
pinMode(echoPin, INPUT); // Sets the echoPin on MCU as an Input
Serial.begin(9600); // This starts the serial communication between MCU
    and PC
}
void loop( ) {
// Clears the trigPin before we start sending and receiving signals
digitalWrite(trigPin, LOW);
delayMicroseconds(2);
// Sets the trigPin on HIGH state for 10 micro seconds to burst output
    signal
digitalWrite(trigPin, HIGH);
delayMicroseconds(10);
digitalWrite(trigPin, LOW);
// Reads the echoPin and returns the sound wave travel time in
    microseconds
duration = pulseIn(echoPin, HIGH);
// Calculating the distance
distance= duration*0.034/2;
// Prints the distance on the Serial Monitor
Serial.print("Distance: ");
Serial.println(distance);
}
```

The aforementioned logging code fills the proper textbox input of distance information and is compared in the NEP to determine the bin capacity status. This status can have flag references which identify proper time of notification services to proper authority, personnel or maintenance.

When the distance sensor determines the distance to be further away at a specified pre-recorded distance to be empty, it compares further information of data collection determining when the distance is closer. The further away the signal reference is, the less discarded material resides in the bin and the closer the signal, the more full the discarded material is to the bin's capacity. The said sonic transducer sends a ping signal into the empty bin to determine a primary status of lack of contents in said bin. Over time as each event occurs, the bin will begin to fill with discarded material whereby after each event, said transducer will activate and record another signal each one progressing to a signal representing a more full bin. The corresponding information is logged in the central processing server and stored for future analytics.

In another embodiment of distance sensing application we can utilize IR distance sensor such as the GP2Y0A41SK0F Sharp sensor. This IR sensor utilizes Light to transmit signals and reads the refractive return signal utilizing a time based reference between the transmission and reception of said IR Light. When the detector area is exposed to a light spot, the device will convert light into several outputs of electrical currents in each of the sensor's electrodes. Using the distribution of the outputs currents you can then find the light position When you add an IR emitting diode you can make a distance sensor determine the capacity of the recyclable bins. The diode will produce light with a specific wavelength (IR) and the light sensor will only detect this wavelength. When an object is close to the device, the light will bounce back on it and the intensity of this light will be measured by the sensor (the voltage in our case). The sensor will then use this data to determine the distance of the object. The code for IR distance sensing would look like this:

```
#define sensor A0
Void setup( ){
    Serial.begin(9600);
}
void loop( ){
    float voltes = analogRead(sensor)*0.0048828125;
    //This value is from the sensor specification * 5/1024
    int distance = 13*pow(volts, -1);
    //This value is worked out from the sensor datasheet graph
        delay(1000)
    //slow down the serial port to give time to read data
    if (distance <= 30){
        Serial.println(distance);
    }
}
```

Here the Serial.println sends the serial data for distance to the central server where the information is logged and stored for analytics or entered into the NEP to be processed to determine if the input distance matches the capacity of the said recyclable bin. If the bin capacity of the corresponding respective recyclable bin is full, notification services can be activated to invoke proper maintenance of the said Methods of Matrix Assisted Intelligent Recycling Chute Selector Devices.

A means to notify proper personnel when said recycle bin is full is comprised of a "MailTo" gateway or SMS gateway whereby a PHP or JSON script or equivalent activates an event driven software which sends pre-recorded Phone messages to Phone numbers belonging to proper personnel who are associated with said services where said personnel are responsible for emptying the bins or maintaining proper operation of the Matrix Assisted Intelligent Recycling Chute Selector Devices. Each of the notification services are not limited to but include Bin capacity, Alarm status, Operational Status, Functionality, Analytics of discarded waste material and Maintenance information. A simple form generated in HTML can be called from a webBrowser1 object class in the C# interface located on the central server. This C# interface receives distance sensing information from the distance sensors or weight load cell which identify the necessity of bin capacity needing to be emptied. The automatic script calls the HTML script which invokes the PHP script to automatically send message for Building Name and Address to the pre-recorded phone number. The HTML code would look like this:

```
<form name="contactform" method="post"
action="send_form_email.php">
<input type="text" name="name" maxlength="50" size="30"
Value="Name_Personnel " >
<input type="text" name="email" maxlength="80" size="30"
value="15555555555@Phone_Carrier.com" >
<textarea name="comments" maxlength="1000" cols="25"
rows="6">Please Check
Building Name & Address for Bin Maintenance! </textarea>
<input type="submit" value="Submit"> <a
href="notification_form.php">SMS
Notification Form</a>
</form>
```

Here a PHP script known as "notification_form.php" is called to handle the transaction between the HTML and the pre-recorded information to relay request to pre-recorded phone stored in the email form whereby a "MailTo" gateway sends request to the Name_Personnel (Replace with name of personnel you wish to notify) a message "Please Check Building Name & Address for Bin Maintenance!" via cellular SMS text messaging services. The PHP script would look like this:

The PHP script acts as a "MailTo" gateway where every phone service provider allows email to txt transmission through submitting an email format of the phone+Carrier information. This format is the Country code such as "1" for the United States followed by the area code "555" followed by the number "5551234" followed by the @Carrier.com replacing said @Carrier.com with the respective carrier mailto gateway suffix.

Bin capacity information is recorded via a central server whereby a text field collects respective bin information which identifies the bin's capacity status. Once each discarding event occurs, the distance sensors and weight sensors collect information which is wirelessly or data over single wire protocol to a serial connection to a central server. The central server contains active software which monitors sensor data from the recycling system. The bin Capacity information is placed in the proper text field and sent to a flat file for storage and retrieval. Each event splits the input text to an output string which is placed in a NEP (Active Natural Event Processor) where said input is compared to stored information. This said stored information is a comparison

```
<?php
if(isset($_POST['email'])) {
        $email_to = "you@yourdomain.com";
        $email_subject = "Your email subject line";
        function died($error) {
                // your error code can go here
                echo "Error(s) found in the form submitted. ";
                echo "These errors appear below.<br /><br />";
                echo $error."<br /><br />";
                echo "Please go back and fix these errors.<br /><br />";
                die( );
        }
        // validation expected data exists
        if(!isset($_POST['name']) ||
                !isset($_POST['email']) ||
                !isset($_POST['comments'])) {
                died('Transmission was Not submitted.');
        }
        $name = $_POST['name']; // required
        $email_from = $_POST['email']; // required
        $comments = $_POST['comments']; // required
        $error_message = "";
        $email_exp ='/^[A-Za-z0-9._%-]+@[A-Za-z0-9.-]+\.[A-Za-z]{2,4}$/';
        if(!preg_match($email_exp,$email_from)) {
                $error_message .= 'Please Check Proper Formatting of Phone Number and Carrier <br />';
        }
        $string_exp = "/^[A-Za-z .'-]+$";
        if(!preg_match($string_exp,$name)) {
                $error_message .= 'The Name not valid.<br />';
        }
        if(strlen($comments) < 2) {
                $error_message .= 'The Comments is not valid.<br />';
        }
        if(strlen($error_message) > 0) {
                died($error_message);
        }
        $email_message = "Form details below.\n\n";
        function clean_string($string) {
            $bad = array("content-type","bcc:","to:","cc:","href");
            return str_replace($bad,"",$string);
        }
        $email_message .= "First Name: ".clean_string($name)."\n";
        $email_message .= "Email: ".clean_string($email_from)."\n";
        $email_message .= "Comments: ".clean_string($comments)."\n";
// create email headers
$headers = 'From: '.$email_from."\r\n".
'Reply-To: '.$email_from."\r\n" .
'X-Mailer: PHP/' . phpversion( );
@mail($email_to, $email_subject, $email_message, $headers);
?>
<?php}
?>
``` library which identifies the sensor data to be relatable to bin capacity. A usage library comparison model can be utilized to determine if the input relates to linear curve usage identifying when possible services and notification may be necessary. By identifying the input data strings as usable stored information, the system can further identify other means for graphical representation of stored data medium.

A means of remote access to recycle system to monitor usage analytics, recycle statistics and weight of recycle bins is comprised of the central server utilizing remote access software such as PCAnywhere, Zoho or SolarWinds which allows users to access PCs from anywhere as long as a network access protocol is available. Said remote access allows maintenance and administrative personnel to send, alter, receive or view status of the entire proposed Methods of Matrix Assisted Intelligent Recycling Chute Selector Devices system. This includes but is not limited to upgrades whereby a remote developer may access said system and alter functionality to improve proper operation of said Methods of Matrix Assisted Intelligent Recycling Chute Selector Devices system. Upgrades may include virtual button selection of Floor Controllers, User Interface of the Central Control Server and even access and upgrading of the firmware located in the sensor's MCU's.

A means to augment intelligent actions to correlate proper functionality of said intelligent waste recycling system is comprised of a NLP (Natural Language Processor) converted to a NEP (Natural Event Processor) where ASCII data from the serial port of the central control server writes inputs to the NLP conversion which interprets the inputs similar to a language input. The said ASCII data corresponds to a plurality of sensor values where first sensor generates an analog signal and said first sensor MCU converts said analog signal to a digital representation of the analog signal. This digital representation is placed in a string to be transported to the central control server via serial connection. The input from the first sensor MCU is placed in a corresponding text field identified by a prefix followed by the sensor value. For instance the weight would be <weight="sensorWeight"> where sensor weight is the value and "weight" is the prefix identifying where the data field should be constrained in the central control server interface. When all data is collected, the data is written to a file for storage and retrieval delimited by the prefix value. The said prefix value posts it's information in the NEP where "Weight" triggers the Boolean match found in a stored "Chat" file. A simple chat Boolean would look like this:

<weight1-1>
    d: Weight of deposited material is below value
    s: Weight of discarded material
    o: Recyclable Material Glass
    b:30*weight*<*100*kg*
    a:*<YIML call setMemory(weight1, %value%)>
    <weight2-1>
    d: Weight of deposited material is equal to or greater and less than value
    s: Weight of discarded material
    o: Recyclable Material Glass
    b:30*weight*=>*175*kg*<=*220*kg*
    a:*<YIML call setMemory(weight2, %value%)>*<YIML call url(http://server.com/notify_check.html)>
    <weight3-1>
    d: Weight of deposited material is greater than value
    s: Weight of discarded material
    o: Recyclable Material Glass
    b:30*weight*>*300*kg*
    a:*<YIML call url(http://server.com/notify_full.html)>

If the input is less than 100 kg, the NEP stores the event and weight, If the input is =to or greater than 175 kg and less than 220 kg, the NEP stores the event and notifies personnel the unit may need to be checked and if the weight exceeds 300 kg, the NEP notifies personnel it is important to check the said bins.

A method to utilize a compactor which compacts waste materials into smaller components to manage waste disposal area is comprised of a hydraulic machine which utilizes a ram whereby said deposited materials enter into the compactor through a narrow opening into a compacting chamber where a ram pushes the disposed material through a smaller opening. The reduction in the opening causes the deposited material to reduce its mass area by approximately 30% however it is known to those skilled in the art of compactors that other mass area reductions can be achieved. In this proposal we currently utilize a simple reduction factor and recognize as much more reduction factors are easily achievable. It is therefore a mechanism in the process of creating a more efficient reduction to dispose and manage discarded materials which increases the efficiency and intelligent usage of said proposed Methods of Matrix Assisted Intelligent Recycling Chute Selector Devices.

A means to utilize linear actuators which activate ledges in hopper doors to manage time of deposited materials entering said chute is comprised of a ledge located directly below the hopper door which restricts the measurable amount which can be deposited at any given time in the chute. The prevention of allowing a simple pass through of deposited material into said chute which limits the cubic area of deposited material prevents the said chute from clogging with too much deposited material at any given time of operation. If several first users one a plurality of floors makes a deposit within the same time frame, a linear actuator can prevent the deposited material from entering when another floor has already made a deposit. These said linear actuators can be computer controlled, timed based transaction or based on how many deposits each first user selects, in such ways to act as a traffic guide allowing deposited material to be discarded when the chute is clear and the sorter or deflector is in proper position.

If a first user on a floor selects position for glass which is opposite of paper, the sorter or deflector will determine when the linear actuator on the floor will activate and drop the deposited material only after it has moved into a proper position whereby said paper is deflected into the paper bin and glass is deflected into the glass bin. The position sensor in the deflector can notify the main control server to actuate the linear actuator causing the deposited material to drop at the correct time preventing clogging of said chute.

A means to maintain and clean said chute utilizing sprinklers and weighted brushes utilizes a sprinkler valve which is connected to the main controller whereby said controller is accessed by a maintenance personnel who activates said sprinkler valve. Once the sprinkler valve is opened and the chute is sprayed down, a spherical weighted brush will be lowered down by a lowering device which allows the brush to clean said chute on the inside where the deposited material travels. Said spherical brush is weighed on the lower end to ensure proper movement through areas which are at an angle rather than a direct decent. Utilizing weights on a spherical brush allows the said brush to easily travel without hang ups in the chute.

A means to provide safety measures during fire and emergencies is comprised of a central control locking system which prevents the opening of a door during times of emergency. The intelligent Methods of Matrix Assisted Intelligent Recycling Chute Selector Devices utilizes a central server which identifies conditions of emergency status thereby said control server and individual door lock controllers prevent the opening of said door during such times of said emergency.

The details of one or more implementations are set forth in the accompanying drawings and the description below. Other features will be apparent from the description and drawings, and from the claims.

BRIEF DESCRIPTION OF THE DRAWINGS

FIG. 5 is a block diagram showing logic of usage which controls each floor if system is in use by other person/s on other floors.

FIG. 6 is a block diagram showing logic of usage which notifies remote maintenance personnel if weight of disposal bin is full or near full condition needing to be emptied.

DETAILED DESCRIPTION OF THE INVENTION

List of Major Components

Figure 1:
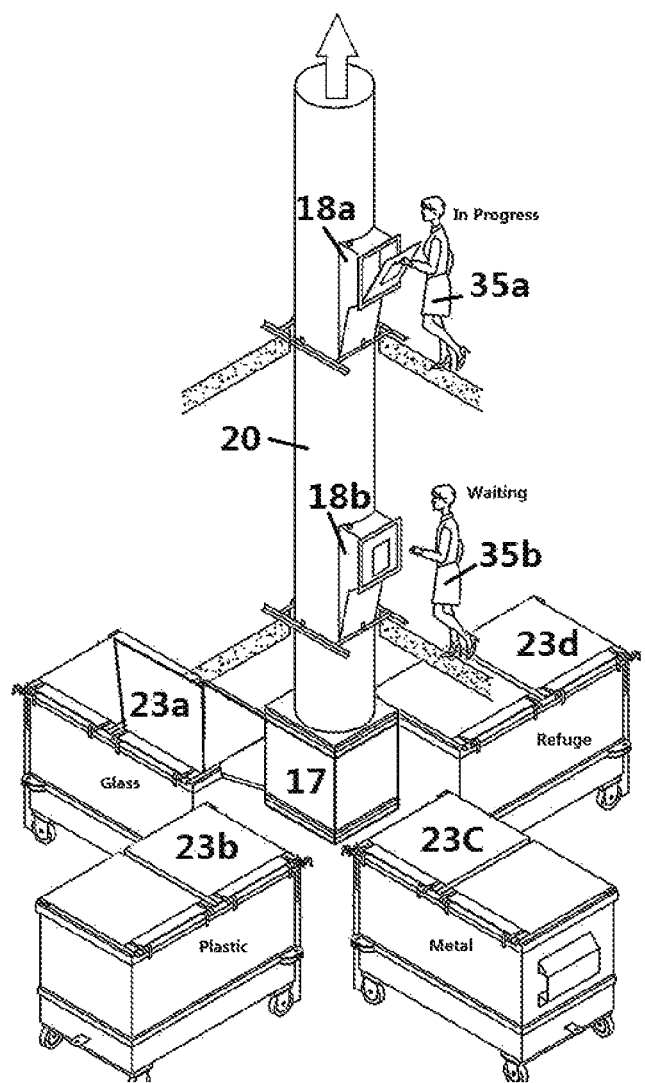
FIG. 1 is a waste chute with a plurality of floors where person/s are discarding waste, floor 1 showing person to be in wait mode and floor 2 person in active progress depicted via touch screen interface which is wirelessly connected in a peer to peer (P2P) topology. Below the chute are a plurality of disposal bins respectively with corresponding recyclable material names respectively and a turret pointed to the Glass disposal bin.

FIG. 1. is a waste chute (20) with a plurality of floors where person/s are discarding waste, floor 1 person (34*b*) showing to be in wait mode and floor 2 person (34*a*) in active progress depicted via touch screen interface (41*a* and 42*b* FIG. 2) which is wirelessly or single wire data transmission connected in a peer to peer (P2P) topology. Below the chute (20) are a plurality of disposal bins (23*a*, 23*b*, 23*c* and 23*d*) respectively with corresponding recyclable material names respectively and a turret containing a diverter or sorter (17) pointed to the Glass disposal bin (23*a* FIG. 1). This said turret can rotate the diverter or sorter (17) (Diverter and sorter are considered one and the same) to pre-selected bins (23*a*, 23*b*, 23*c* and 23*d*) respectively according to users (34*b* and 34*a*) on each floor as long as another floor is not currently in use by another person disposing of discarded material.

Figure 2:
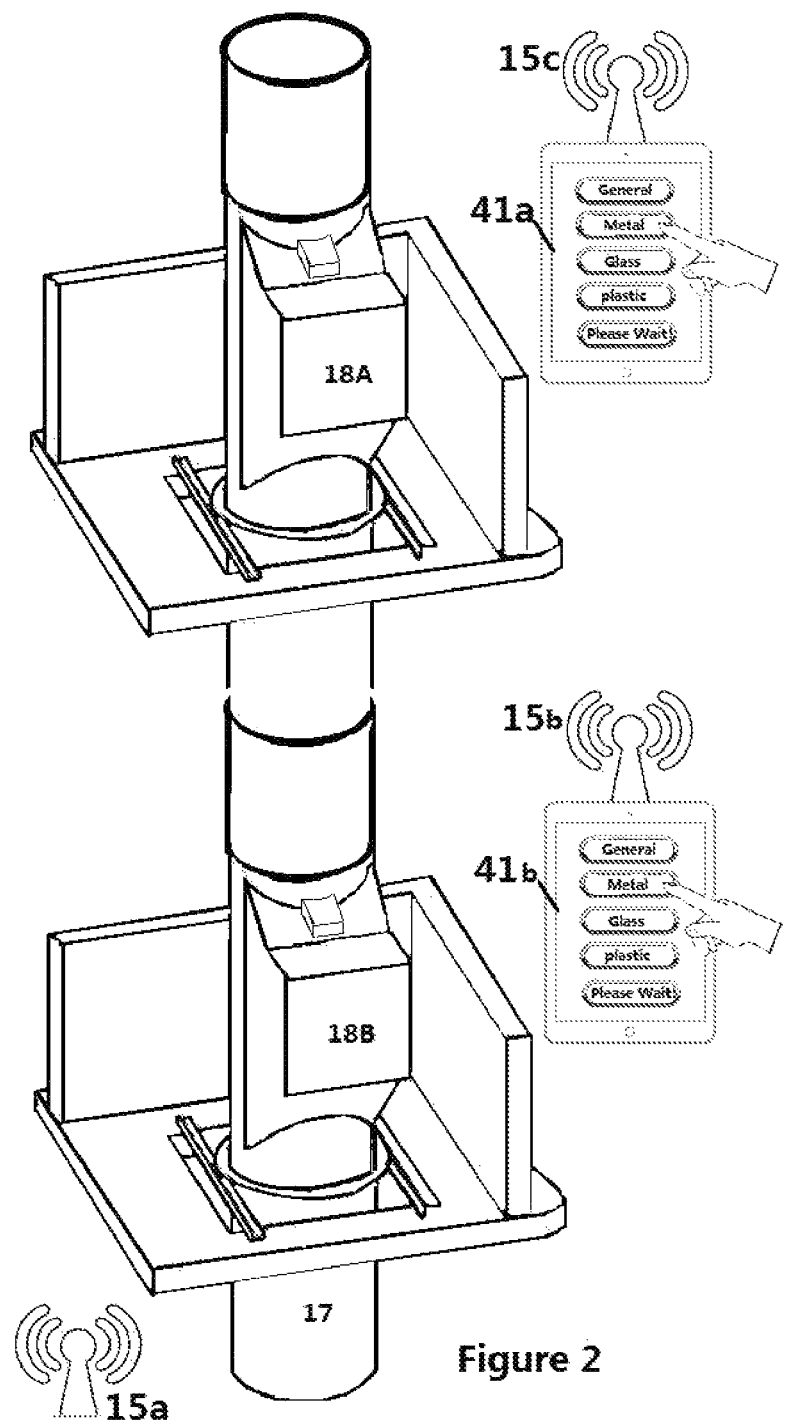
FIG. 2 is a waste chute with a plurality of access interfaces on separate floors whereby each floor depicted by a user interface (UI) with a plurality of recyclable selections which act to rotate the turret below the chute FIG. 1

FIG. 2 is a waste chute (20) with a plurality of access interfaces (41*a* & 41*b*) on separate floors whereby each floor depicted by a user interface (UI) with a plurality of recyclable selections (51, 53, 55 and 57 FIG. 4) which act to rotate the turret thereby rotating the sorter (17 FIGS. 1 and 2) also seen below the chute (20) in FIG. 1. Each touch screen (41*a* and 41*b*) contains a User Interface (51) (Interface containing buttons (51, 53, 55 and 57 FIG. 4) for proper selection of discarded materials identifying the proper position of the sorter (17 FIGS. 1 and 2) by said user (34*a* and 34*b*).

Figure 3:
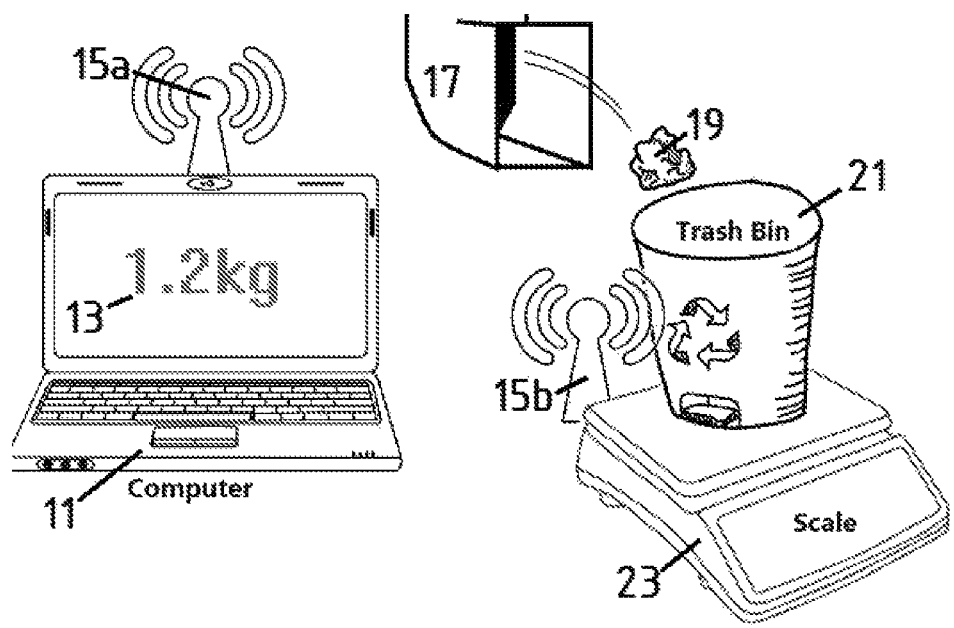
FIG. 3. is a wireless scale which weighs recycle bin and wirelessly sends information to a user interface to denote weight of deposited recyclable waste. Note: The UI will contain a "Natural Event Processor" which analyzes waste usage for future analytics.

FIG. 3 is a wireless scale (23) which weighs recycle bin (21) and wirelessly sends information (15*b* to 15*a*) to a central processing server (11) containing a user interface (13) to denote weight (13) of deposited recyclable waste (19). Said waste was diverted from a sorter (17) which traveled from a floor above which was preselected for waste to deposit in trash bin (21) prior to being weighed on a wireless (15*b*, 15*a*) scale (23). Note: The UI (13) will contain a "Natural Event Processor" (Not shown) which analyzes waste usage for future analytics.

Figure 4:
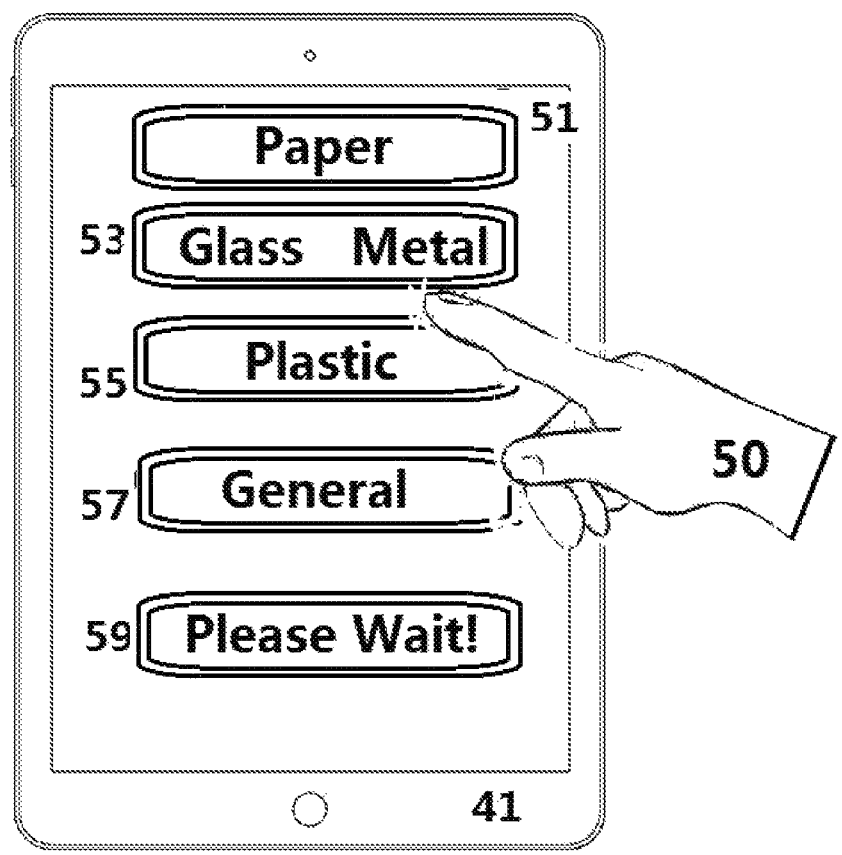
FIG. 4 is a User Interface with a plurality of selections for recyclable deposits being Glass, Plastic, Metal and Rubbish with bottom selection showing "Wait" mode which is determined if the system is in prior use by another person/s on other floors. (Not Shown)
Figure 4A:
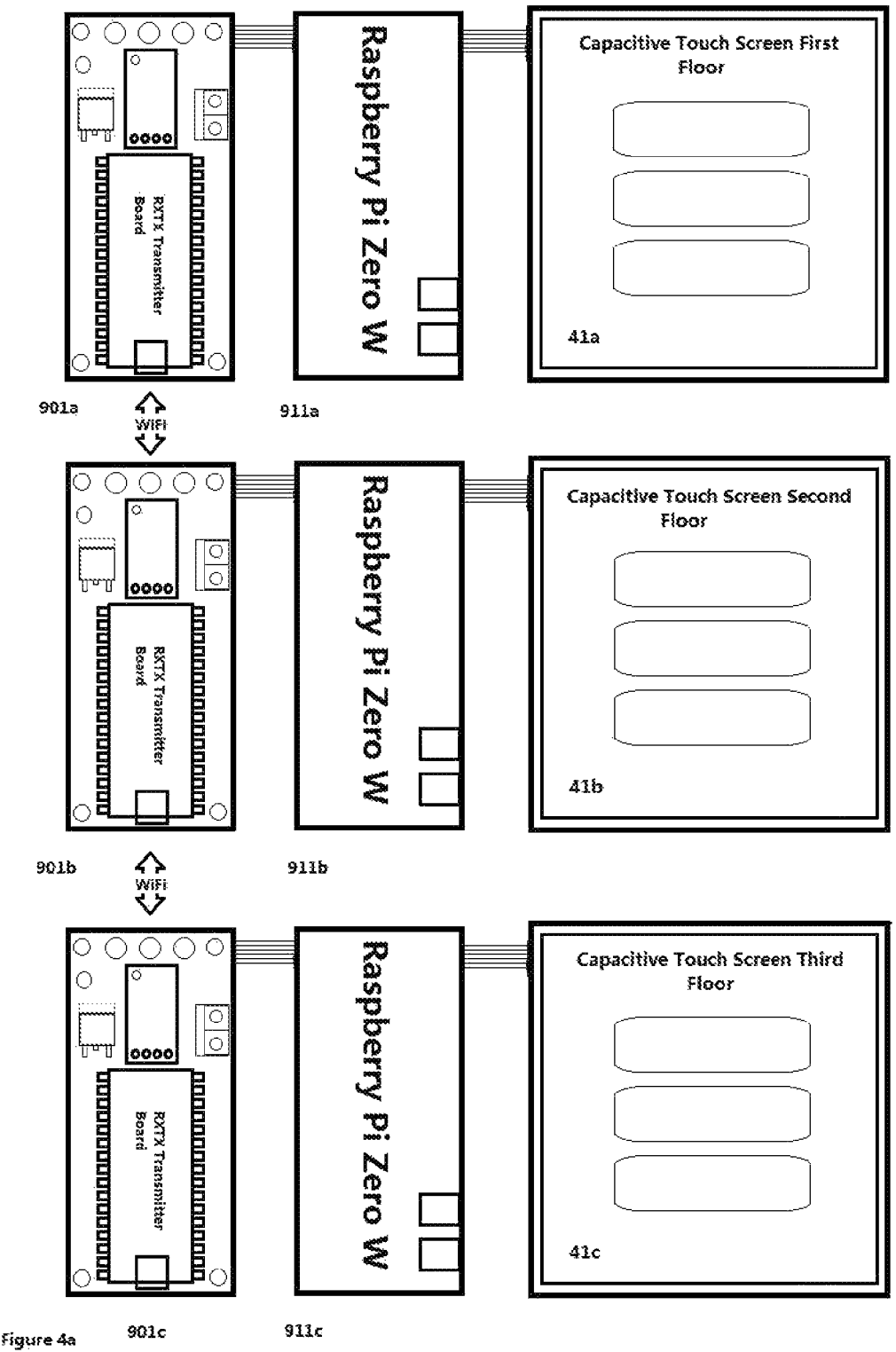
FIG. 4a is a User Interface with a plurality of selections for recyclable deposits being Glass, Plastic, Metal and Rubbish with hardware which is activated via touch screen interface. A button correlating to the system I/O sends signal to the processing unit and to a MCU for activation of user selected functions and actions.

FIG. 4 is a User Interface (41) with a plurality of selections, for recyclable deposits being General (51), Metal (53), Glass (55) and Plastic (57) with bottom selection showing "Wait" mode (59) which is determined if the system is in prior use by another person/s on other floors. (Not Shown). When each selection is made a control signal activates a wired or wireless transmission FIG. 4*a* is a plurality of User Interfaces (41*a*, 41*b* and 41*c*) with a plurality of selections (51, 53, 55 and 57 FIG. 4) for recyclable deposits being General (51), Metal (53), Glass (55) and Plastic (57) with hardware defined as a central processing unit (911*a*, 911*b* and 911*c*) respectively which is activated via touch screen interface (41) A virtual button correlating to the system I/O sends signal to the processing unit (911a, 911b and 911c) respectively and to a MCU (901a, 901b and 901c) for wireless activation of user selected functions and actions. In this case the user interface utilizes a touch screen interface which is proposed as a python developed interface however other such applications such as C, C# and JSON may be utilized to achieve the same results.

FIG. 5 is a block diagram showing logic of usage which controls each floor if system is in use by other person/s on other floors. The logical block begins with a select option whereby said user (35a and 35b FIG. 1) on each floor selects an option on the touch screen (41a and 41b FIG. 2) which determines if the system is in use. If the system is in use is true, all floors lock doors (18a and 18b FIG. 2) and notification services identify each node as "System In Use". If the system in use is false, the turret rotates to perspective selected position whereby sorter points to the proper bin for recyclable material to be discarded. The Door is unlocked to allow user access for discarding recyclable material down the chute to the sorter or diverter where the said deposit is weighed and the deposit event log is generated.

FIG. 6 is a block diagram showing logic of usage which notifies remote maintenance personnel if weight of disposal bin is full or near full condition needing to be emptied. The logical block begins with a select option whereby said user (35a and 35b FIG. 1) on each floor selects an option on the touch screen (41a and 41b FIG. 2) which determines if the system is in use. If the system is in use is true, all floors lock doors (18a and 18b FIG. 2) and notification services identify each node as "System In Use". If the system in use is false, the turret rotates to perspective selected position whereby sorter points to the proper bin for recyclable material to be discarded. The Door is unlocked to allow user access for discarding recyclable material down the chute to the sorter where the said deposit is weighed and the deposit event log is generated. The said generated information is placed in a NEP or Natural Event Processor where the bin is weighed to determine if it is full requiring notification services. If the bin being full is false, the system returns to the wait screen waiting for the next scale weight event but if the system full is true, the notification internet services can be implemented to notify proper authority, personnel or administrative persons to check on the bin's capacity for proper determined services.

Figure 7:
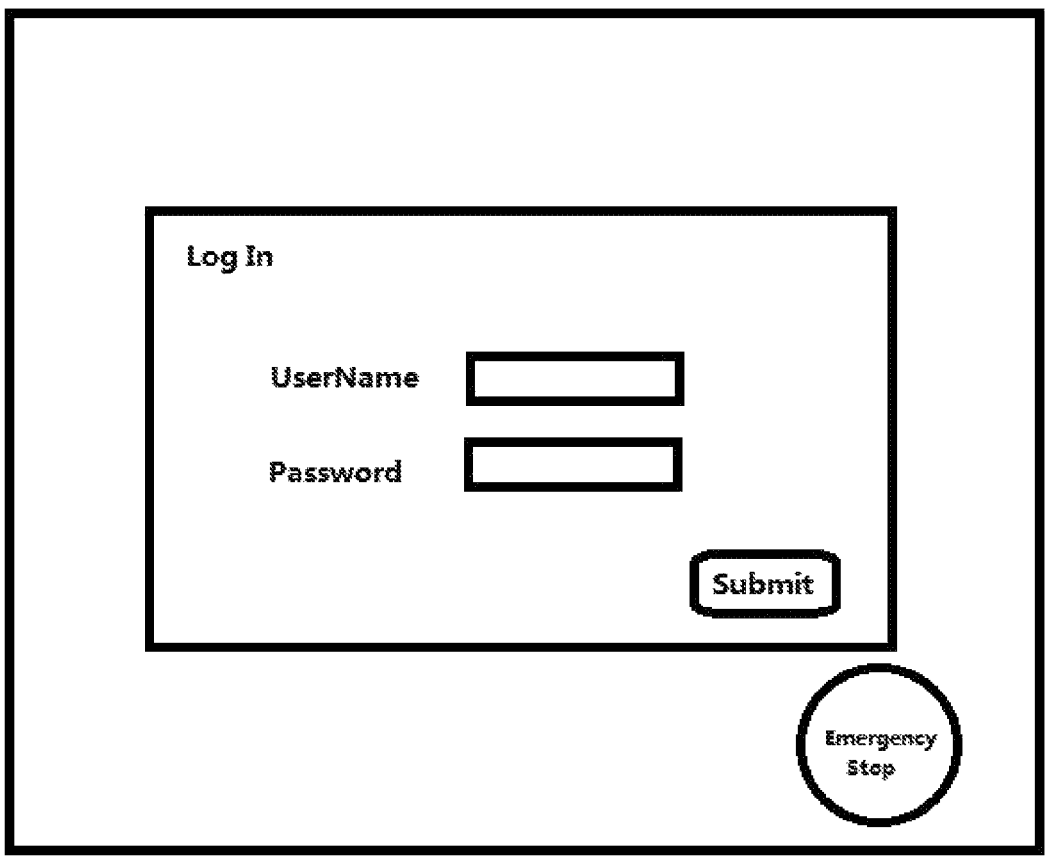
FIG. 7 is a login Screen for the control panel restricting access to only participants allowed to alter or view functions of the central control server. Said control panel contains an emergency stop to stop all functions and actions of the intelligent Recycling system.

FIG. 7 is a login Screen for the control panel restricting access to only participants allowed to alter or view functions of the central control server. The said user interface contains a first screen which allows proper access to said second screens which give proper authority the ability to view actions and functions of the intelligent recycling system. User enters proper user name and password to access said system and selects the submit button before allowing access to the second screen. To the left below the touch panel shows an emergency stop button which shuts down functions and actions of the entire intelligent recycling system.

Figure 8:
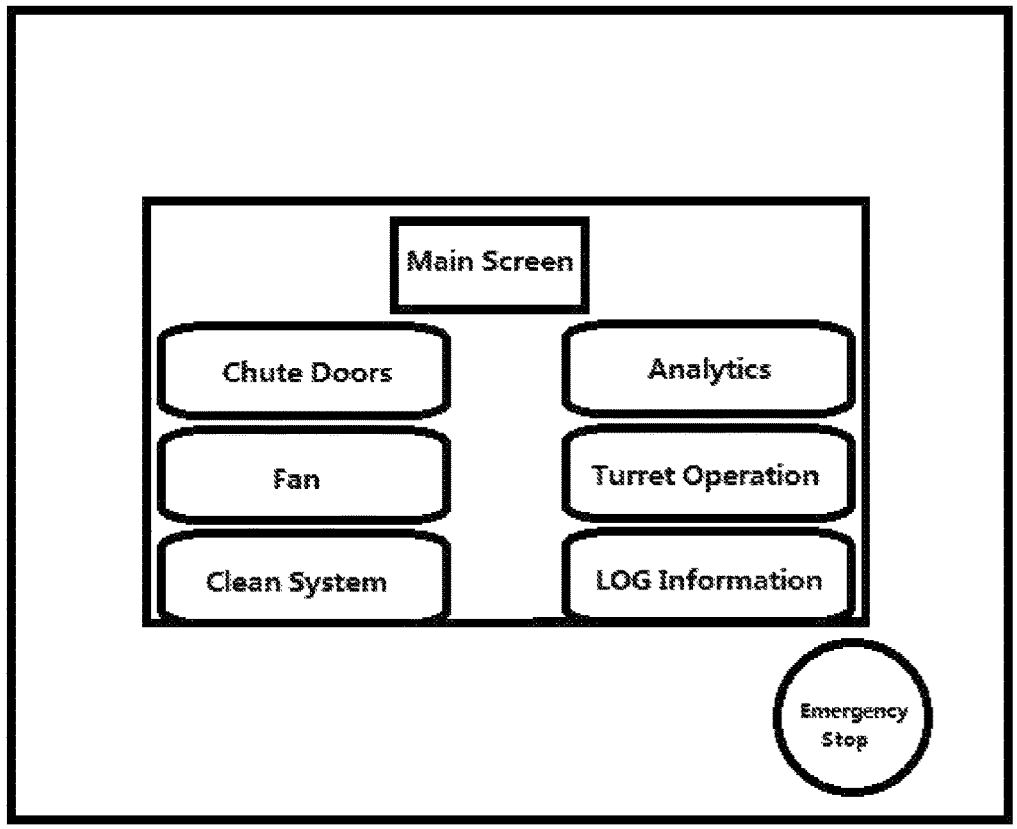
FIG. 8 is a Main screen leading to programs which assist maintenance and administrators in viewing, altering and updating existing code on the central control server. Said control panel contains an emergency stop to stop all functions and actions of the intelligent Recycling system.

FIG. 8 is a Main screen leading to programs which assist maintenance and administrators in viewing, altering and updating existing code on the central control server. Each of the buttons on the Second Screen User Interface contains access to a more in-depth operation of the intelligent recycling system where Chute Doors allows user access to monitor and control each of the Chute Doors on the system. The fan refers to the ventilation fan which user can control during proper maintenance of said intelligent recycling system. The Clean System refers to the sprinkler system which utilizes a spray nozzle and spherical brush which lowers down the chute to clean the chute and is part of the maintenance of the intelligent recycling system. The analytics is access to the graphical representation of user usage over time which shows usage of the intelligent recycling system. The turret operation virtual button sends the user to a screen to manually operate the Turret during maintenance and finally the Log Information is the data storage and retrieval system where intelligent NLP and NEP processing of user information is converted event processing. Said event processing can be altered for a better long term functionality of the said intelligent recycling system. To the left below the touch panel shows an emergency stop button which shuts down functions and actions of the entire intelligent recycling system. Said proposed recycling system enhancements improve upon the BMI or Building Management Information code standards.

Figure 9:
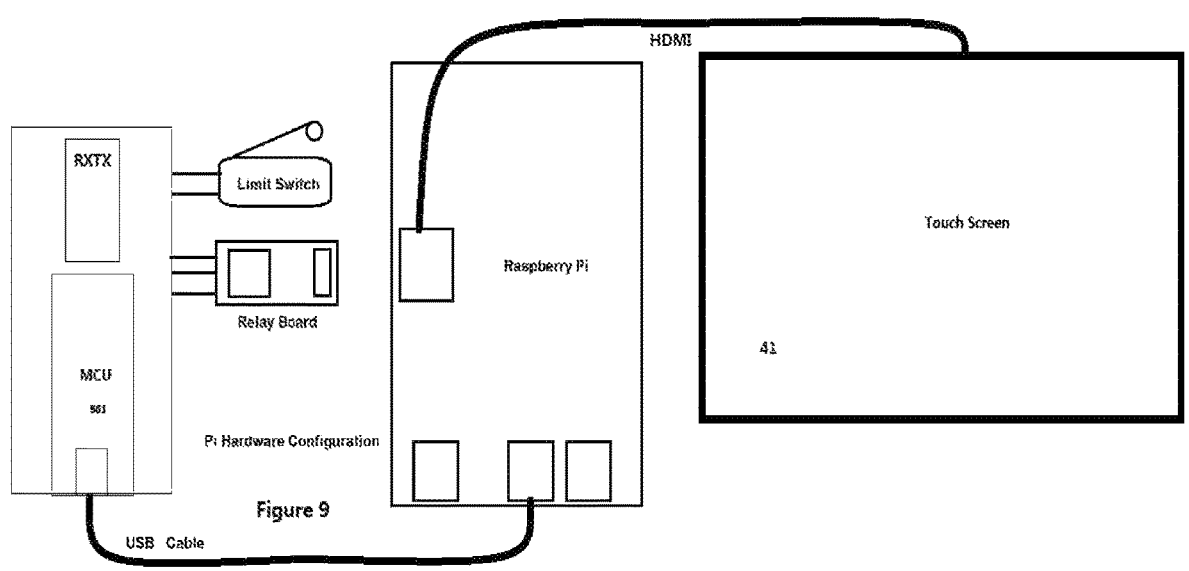
FIG. 9 is a PLC (Programmable Logic Controller) which in this case identified as such not to be confused with the aforementioned PLC (Power Line Carrier or Power Logic Carrier) used in the methods of preferred embodiments where PLC carries a plurality of meanings, is used to interpret user actions to functions interpreted by the central server controller whereby proper analytics and actions of proper operation of the intelligent recycling system can be processed. Included in the drawing is a limit switch to determine if the local door has been shut by the user as well as relays or plurality of relays which can be operated to send voltage signals to the central server controller.

FIG. 9 is a PLC (Programmable Logic Controller) (911) which in this case identified as such not to be confused with the aforementioned PLC (Power Line Carrier or Power Logic Carrier) used in the methods of preferred embodiments where PLC carries a plurality of meanings, is used to interpret user actions to functions interpreted by the central server controller whereby proper analytics and actions of proper operation of the intelligent recycling system can be processed. Included is a limit switch to determine if the local door has been shut by the user as well as relays or plurality of relays which can be operated to send voltage signals connected to a MCU (901) which wired or wirelessly sends data to the central server controller for further processing of proper functions and actions of the intelligent recycling system.

Figure 10:
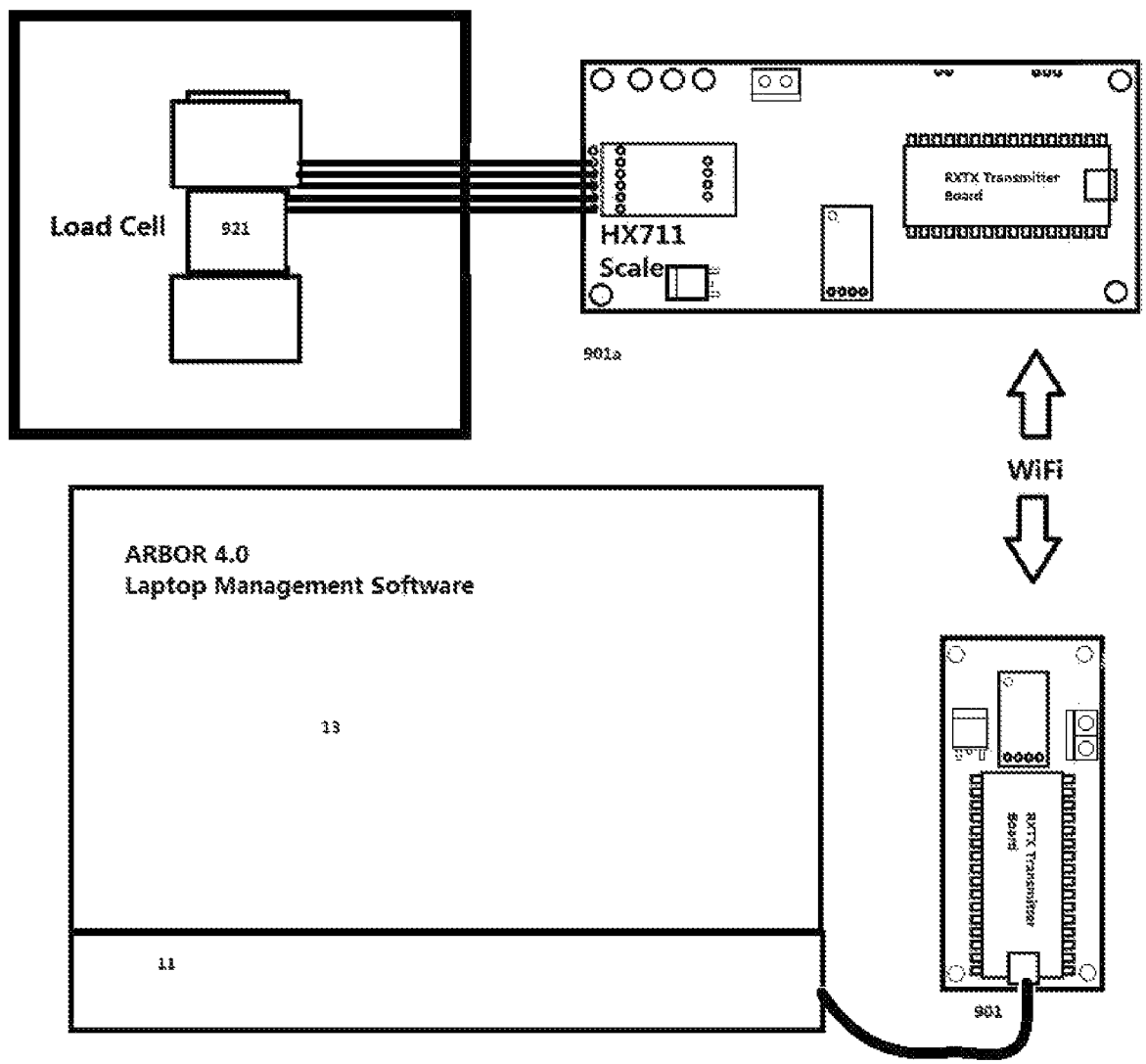
FIG. 10 is a HX711 Load cell interface which determines weight of discarded material connected to a wireless hardware allowing communication between the hardware interface and the PC central server computer.

FIG. 10 is a HX711 Load cell (921) interface (901) HX711 which determines weight of discarded material by converting load cell (921) analog sensor information to digital for communication transport over a serial protocol utilizing a WiFi transceiver (901a) to a receiver connected to a wireless hardware (901) allowing communication between the hardware interface (901a) and the PC central server computer (11); Said information collected from said load cell (921) to be represented graphically on user interface (13) on the PC central server computer (11).

Figure 11:
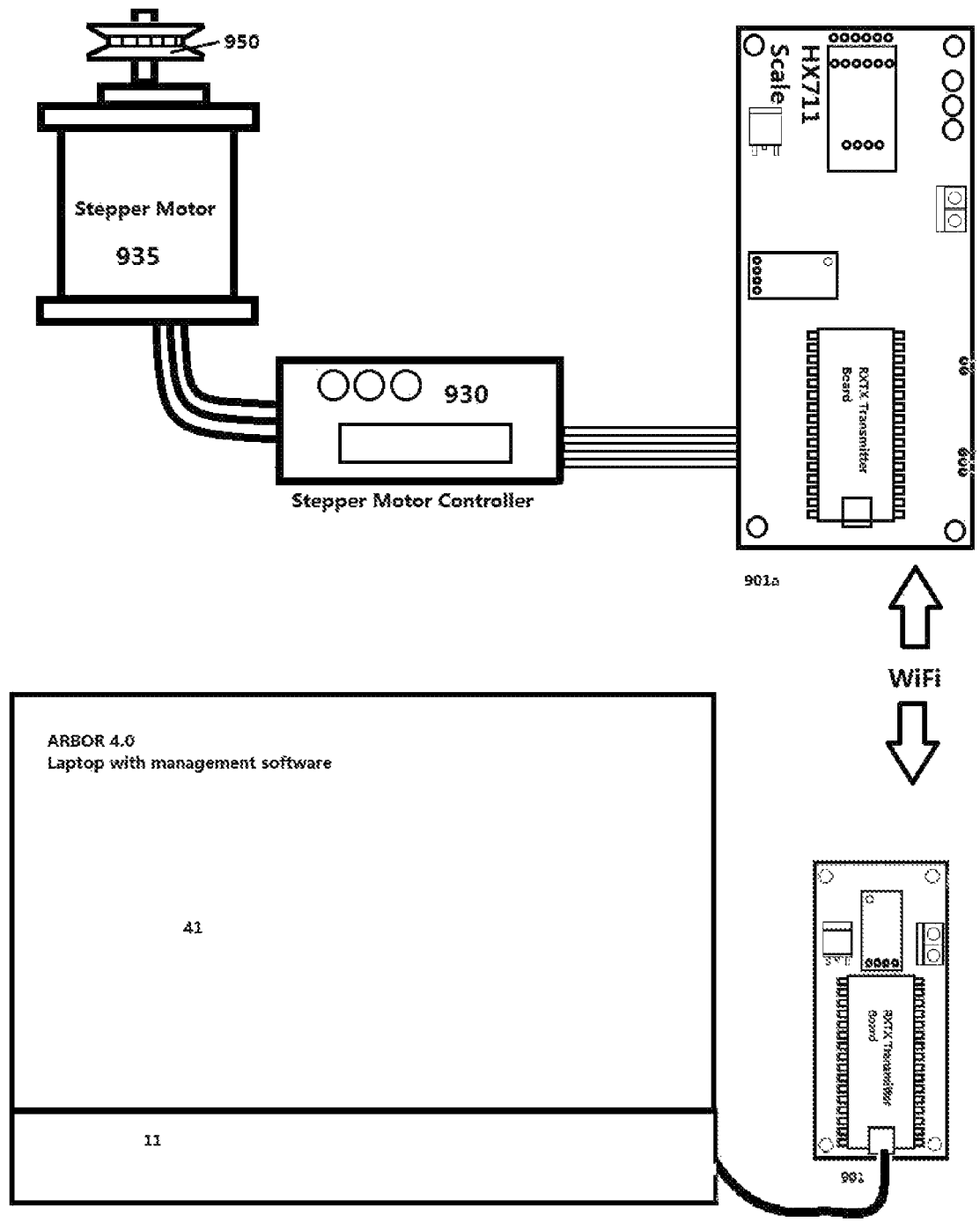
FIG. 11 is a Stepper Motor Driver and Stepper Motor with an interface which determines direction of the sorter which discards the material in a proper bin which is connected to a wireless hardware allowing communication between the hardware interface and the PC central server computer.

FIG. 11 is a Stepper Motor Driver (930) and Stepper Motor (935) with an interface (13) which determines direction of the sorter which discards the material in a proper bin which is connected to a wireless hardware (901a) allowing communication between the hardware interface and the PC receiver (901) central server computer (11). Information sent from the floor controllers is transferred to the receiver (901) whereby said central server computer makes decisions to tell the Stepper Motor (935) the direction to turn based on user selection.

What is claimed is:
1. An intelligent recycling system comprising:
   a plurality of interfaces, each of the plurality of interfaces is associated with each floor of a plurality of floors and configured to receive a user selection input for selecting a type of a plurality of discarded materials, respectively, wherein the user selection input is related to an event and is provided by a plurality of users, respectively;
   a weight determining sensor configured to determine a weight of the plurality of discarded materials being discarded through a chute;
   a capacity determining sensor configured to detect a remaining available capacity of a plurality of bins disposed at an end of the chute; and a primary hardware controller interface configured to receive information related to the user selection input from the plurality of interfaces, respectively, wherein, for each of the plurality of users providing the user selection input, the primary hardware controller interface is further configured to:

store the received information for analytics, control operations of a sorter disposed at the end of the chute based on the received information so that a material among the plurality of discarded materials is directed to a corresponding bin among the plurality of bins, based on the user selection input of a user discarding the material, control a weighting operation of the weight determining sensor for the material discarded through the chute into the corresponding bin, control the capacity determining sensor to detect the remaining available capacity of the corresponding bin, record data related to the event, perform Natural Event Processing (NEP) using the recorded data related to the event, the data comprising at least identification of the user who provided the user selection input, the weight and the type of the material discarded by the user, and input data obtained from the capacity determining sensor, thereby learning traits and habits of discarding waste by the plurality of users, and improving waste management and recycling efficiency of the intelligent recycling system, and based on a result of the NEP, identify when a bin capacity of the corresponding bin will reach a full capacity, prior to the corresponding bin reaching the full capacity.

2. The intelligent recycling system of claim 1 wherein the intelligent recycling system utilizes the Natural Event Processing (NEP) to enhance operations by Bayesian protocols.

3. The intelligent recycling system of claim 1 wherein the Natural Event Processing (NEP) utilizes probability Boolean comparators to determine proper operation and improve functionality of the intelligent recycling system.

4. The intelligent recycling system of claim 1 wherein the plurality of interfaces utilizes a single wire data protocol to communicate between nodes on each floor to signal proper operation and function of the intelligent recycling system.

5. The intelligent recycling system of claim 1 wherein the plurality of interfaces utilizes a wireless data protocol to communicate between nodes on each floor to signal proper operation and function of the intelligent recycling system.

6. The intelligent recycling system in claim 1 wherein the plurality of interfaces utilize a single wire data protocol to communicate between a first user interface among the plurality of interfaces and a hardware control interface associated with the first user interface.

7. The intelligent recycling system in claim 1 wherein the plurality of interfaces utilize a wireless data protocol to communicate between a first user interface among the plurality of interfaces and a first hardware control interface.

8. The intelligent recycling system of claim 2 wherein the Bayesian Protocols include an improvement of operations using an adaptive neural network learning of the analytics.

9. The intelligent recycling system of claim 3 wherein the Natural Event Processing (NEP) includes an improvement of operations using an adaptive neural network learning of the analytics.

10. An intelligent recycling system utilizing Natural Event Processing (NEP), the intelligent recycling system comprising:

a plurality of first user interfaces, each of the plurality of first user interfaces is associated with each floor of a plurality of floors and configured to receive a user selection input for selecting a type of a plurality of discarded materials, respectively, and is further associated with a plurality of second control interfaces, respectively, wherein the plurality of second control interfaces controls a rotation of a sorter and diverter device disposed at an end of a chute, and wherein the user selection input is related to an event and is provided by a plurality of users, respectively;

a weight determining sensor configured to determine a weight of the plurality of discarded materials being discarded through the chute;

a capacity determining sensor configured to detect a remaining available capacity of a plurality of bins disposed at the end of the chute;

a memory for storing instructions; and a processor connected to the memory and, by executing the instructions, is configured to receive information related to the user selection input from the plurality of first user interfaces, respectively, wherein, for each of the plurality of users providing the user selection input, the processor is further configured to:

store the received information for analytics, transfer the received information to a corresponding second control interface among the plurality of second control interfaces, to control the rotation of the sorter and diverter device based on the received information so that a material among the plurality of discarded materials is directed to a corresponding bin among the plurality of bins, based on the user selection input of a user discarding the material, control a weighting operation of the weight determining sensor for the material discarded through the chute into the corresponding bin, control the capacity determining sensor to detect the remaining available capacity of the corresponding bin, record data related to the event, perform Natural Event Processing (NEP) using the recorded data related to the event, the data comprising at least identification of the user who provided the user selection input, the weight and the type of the material discarded by the user, and input data obtained from the capacity determining sensor, and based on a result of the NEP, predict when a bin capacity of the corresponding bin will reach a full capacity, prior to the corresponding bin reaching the full capacity.

11. The intelligent recycling system of claim 10 wherein a first user interface among the plurality of first user interfaces contains individual proper operational instructions to control the intelligent recycling system if a system failure of said corresponding second control interface makes the corresponding second control interface unavailable.

12. The intelligent recycling system of claim 10 wherein each of the plurality of first user interfaces contains a power backup device, which ensures proper operation of functionality in case of a system failure, thereby ensure each node still communicates and properly operates during a power failure.

13. The intelligent recycling system of claim 10 wherein the corresponding second control interface returns the sorter and diverter device to a home position to ensure that any discarded material will fill the corresponding bin which was identified to correspond to the user selection input entered by the user on a first user interface among the plurality of first user interfaces, during a power outage.

14. The intelligent recycling system of claim 10 wherein the corresponding second control interface utilizes an intelligent Natural Language Processor (NLP) and a Bayesian neural network for analytics of each event for adaptive usage statistics.

15. The intelligent recycling system of claim 14 wherein the adaptive usage statistics is derived from deviations of prior usage events.

16. The intelligent recycling system in claim 15 wherein the adaptive usage statistics includes the weight as a statistical element.

17. The intelligent recycling system of claim 15 wherein the adaptive usage statistics includes the type of the plurality of discarded materials as a statistical element.

18. The intelligent recycling system of claim 15 wherein the adaptive usage statistics includes time of discarded material as a statistical element.

19. The intelligent recycling system of claim 15 wherein the adaptive usage statistics includes a date of discarded material as a statistical element.

20. The intelligent recycling system of claim 16, wherein the statistical element is utilized to generate the adaptive usage statistics, which is recorded, analyzed and utilized for future comparison of predictive modeling of discarded waste.

21. The intelligent recycling system of claim 20 wherein the predictive modeling determines when the corresponding bin is full, about to be full, or in need of proper maintenance.

22. The intelligent recycling system of claim 20 wherein the predictive modeling determines operational usage and selection, which is converted into a graphical representation and can be shared over a network or web.

23. A system for accessing, monitoring, altering or upgrading the Natural Event Processing (NEP) of claim 2, which creates the intelligent recycling system over a remote network.

24. The system of claim 23 wherein the accessing, monitoring, altering or upgrading the intelligent recycling system can be done on a wireless network.

25. The system of claim 23 wherein the accessing, monitoring, altering or upgrading can be done on a Personal Area Network.

26. The system of claim 25 wherein the personal area network is an intranet.

27. The system of claim 25 wherein the personal area network is Internet.

28. The intelligent recycling system of claim 1, wherein the weight is converted from an analog signal to data and is transferred via wire data protocols utilizing conductive wire modulation schemes to a remote destination, to be processed by a central processing server.

29. The intelligent recycling system of claim 1, wherein the weight is converted from an analog signal to data and is transferred via wireless data protocols utilizing conductive wire modulation schemes to a remote destination to be processed by a central processing server.

30. A system of selector control for an intelligent recycling system utilizing Natural Event Processing (NEP), the system comprising:
    a plurality of interfaces, each of the plurality of interfaces is associated with each floor of a plurality of floors and configured to receive a user selection input for selecting a type of a plurality of discarded materials, respectively, wherein the user selection input is related to an event and is provided by a plurality of users, respectively;
    a plurality of different types of sensors disposed by a door of a chute and configured to identify the type of the plurality of discarded materials, respectively, prior to the door of the chute being open; and
    a primary hardware controller interface configured to receive information related to the user selection input from the plurality of interfaces, respectively,
    wherein, for each of the plurality of users providing the user selection input, the primary hardware controller interface is further configured to:
        control the plurality of different types of sensors to provide sensor data related to an actual type of a material being discarded by a user who provided the user selection input,
        based on the sensor data, identify whether the actual type of the material matches the type of the material selected via the user selection input,
        based on the actual type of the material matching the type of the material selected via the user selection input, control to open the chute and control operations of a diverter disposed at an end of the chute to direct the material discarded by the user to a respective bin among a plurality of bins that corresponds to the type of the material that is selected by the user selection input, and
        based on the actual type of the material not matching the type of the material selected via the user selection input, control to open the chute and control operations of the diverter to direct the material discarded by the user to a respective bin among the plurality of bins that corresponds to the actual type of the material that is identified based on the sensor data provided by the plurality of different types of sensors.

31. The system of claim 30 wherein at least a first type of a sensor among the plurality of different types of sensors is an Ultra Sonic Transducer.

32. The system of claim 30 wherein at least a first type of a sensor among the plurality of different types of sensors is a Laser Scanner.

33. The system of claim 30 wherein at least a first type of a sensor among the plurality of different types of sensors is a Matrix Assisted Laser Desorption Identification density Scanner.

* * * * *